United States Patent
Carroll et al.

(10) Patent No.: US 12,263,762 B2
(45) Date of Patent: Apr. 1, 2025

(54) REINFORCED TRACK ASSEMBLY FOR VEHICLE SEAT

(71) Applicant: Camaco, LLC, Farmington Hills, MI (US)

(72) Inventors: Jeff Carroll, West Bloomfield, MI (US); Sanjay Vakil, Troy, MI (US); Mohammad Fazli, Farmington Hills, MI (US); Yang Cao, Troy, MI (US); Harish Bijwe, Novi, MI (US)

(73) Assignee: CAMACO, LLC, Farmington Hills, MI (US)

( * ) Notice: Subject to any disclaimer, the term of this patent is extended or adjusted under 35 U.S.C. 154(b) by 0 days.

(21) Appl. No.: 18/330,176

(22) Filed: Jun. 6, 2023

(65) Prior Publication Data
US 2023/0311719 A1    Oct. 5, 2023

Related U.S. Application Data

(63) Continuation of application No. 17/686,889, filed on Mar. 4, 2022, now Pat. No. 11,708,011.

(60) Provisional application No. 63/157,331, filed on Mar. 5, 2021.

(51) Int. Cl.
*B60N 2/07* (2006.01)
*B60N 2/08* (2006.01)

(52) U.S. Cl.
CPC ......... *B60N 2/0705* (2013.01); *B60N 2/0818* (2013.01)

(58) Field of Classification Search
CPC ...... B60N 2/0705; B60N 2/0818; B60N 2/08; B60N 2/067; B60N 2/0232; B60N 2/065; B60N 2/2209; B60N 2002/0236; B60N 2002/024

USPC .................................................. 248/428, 429
See application file for complete search history.

(56) References Cited

U.S. PATENT DOCUMENTS

| | | | |
|---|---|---|---|
| 5,641,146 A * | 6/1997 | Hoshihara | B60N 2/0715 297/344.11 |
| 5,772,173 A | 6/1998 | Couasnon | |
| 5,855,350 A * | 1/1999 | Volker | B60N 2/0705 248/430 |
| 6,322,036 B1 | 11/2001 | Tame et al. | |

(Continued)

FOREIGN PATENT DOCUMENTS

| | | |
|---|---|---|
| EP | 1 176 047 A1 | 1/2002 |
| EP | 2 298 590 A1 | 3/2011 |

(Continued)

OTHER PUBLICATIONS

International Search Report on PCT/US2022/18898 dated Jun. 29, 2022.

(Continued)

*Primary Examiner* — Nkeisha Smith
(74) *Attorney, Agent, or Firm* — FOLEY & LARDNER LLP

(57) ABSTRACT

A track assembly includes a first track having a first support extending from a first surface of the first track. The first support includes a first curved end. The track assembly includes a second track slidably coupled to the first track. The second track includes a second support extending from a second surface of the second track. The second support includes a second curved end. The first support and the second support are positioned such that the second curved end interfaces with the first curved end.

19 Claims, 17 Drawing Sheets

(56) References Cited

U.S. PATENT DOCUMENTS

| | | | |
|---|---|---|---|
| 6,354,553 B1 | 3/2002 | Lagerweij et al. | |
| 6,474,739 B1 | 11/2002 | Lagerweij | |
| 6,557,809 B2* | 5/2003 | Downey | B60N 2/0715 384/46 |
| 6,641,104 B2 | 11/2003 | Flick | |
| 6,892,995 B2 | 5/2005 | Tame et al. | |
| 6,902,235 B2 | 6/2005 | Rohee | |
| 6,923,415 B2 | 8/2005 | Yokoi et al. | |
| 6,953,178 B2 | 10/2005 | Yamada et al. | |
| 7,328,877 B2 | 2/2008 | Yamada et al. | |
| 7,357,051 B2 | 4/2008 | Raum | |
| 7,523,913 B2 | 4/2009 | Mizuno et al. | |
| 7,780,138 B1 | 8/2010 | Lee et al. | |
| 8,033,520 B2 | 10/2011 | Fujieda et al. | |
| 8,079,759 B2* | 12/2011 | Rohee | B60N 2/015 384/34 |
| 8,167,372 B2 | 5/2012 | Hazlewood | |
| 8,376,460 B2 | 2/2013 | Nadgouda et al. | |
| 8,382,057 B2 | 2/2013 | Napau et al. | |
| 8,398,144 B2 | 3/2013 | Nord et al. | |
| 8,550,420 B2 | 10/2013 | Wojatzki et al. | |
| 8,573,698 B2 | 11/2013 | Wojatzki et al. | |
| 8,646,742 B2* | 2/2014 | Hayashi | B60N 2/0818 248/419 |
| 8,668,180 B2 | 3/2014 | Shiraki | |
| 8,800,949 B2 | 8/2014 | Schebaum et al. | |
| 8,827,229 B2 | 9/2014 | Wakayama et al. | |
| 8,870,147 B2 | 10/2014 | Simms et al. | |
| 9,010,713 B2 | 4/2015 | Kim | |
| 9,050,908 B2* | 6/2015 | Speck | B60N 2/427 |
| 9,067,514 B2 | 6/2015 | Oh et al. | |
| 9,108,532 B2* | 8/2015 | Seille | B60N 2/0705 |
| 9,162,596 B2 | 10/2015 | Kato et al. | |
| 9,180,796 B2 | 11/2015 | Markel | |
| 9,205,763 B2 | 12/2015 | Anticuar et al. | |
| 9,227,528 B2 | 1/2016 | Yamada et al. | |
| 9,393,883 B2 | 7/2016 | Wojatzki et al. | |
| 9,533,604 B2 | 1/2017 | Nakashima et al. | |
| 9,963,049 B2* | 5/2018 | Quast | B60N 2/0732 |
| 10,131,250 B2 | 11/2018 | Flick | |
| 10,160,350 B2* | 12/2018 | Ioppolo | B60N 2/0705 |
| 10,195,963 B2 | 2/2019 | Flick et al. | |
| 10,266,074 B2 | 4/2019 | Anticuar et al. | |
| 10,363,839 B2 | 7/2019 | Fukuda et al. | |
| 10,500,987 B2 | 12/2019 | Anticuar et al. | |
| 10,611,272 B2* | 4/2020 | Quast | F16C 29/063 |
| 10,703,228 B2 | 7/2020 | Anticuar et al. | |
| 10,843,593 B2* | 11/2020 | Dicicco | B60N 2/0868 |
| 10,906,431 B2 | 2/2021 | Condamin et al. | |
| 11,440,441 B2 | 9/2022 | Basarik et al. | |
| 11,679,694 B2* | 6/2023 | Zhao | B60N 2/0875 248/429 |
| 2004/0084926 A1* | 5/2004 | Muller | B60N 2/0705 296/65.14 |
| 2005/0205746 A1 | 9/2005 | Jung | |
| 2005/0224680 A1 | 10/2005 | Strubel et al. | |
| 2009/0007718 A1* | 1/2009 | Beneker | B60N 2/0843 74/535 |
| 2010/0133407 A1 | 6/2010 | Fujieda et al. | |
| 2010/0201173 A1 | 8/2010 | Boes | |
| 2013/0193730 A1 | 8/2013 | Walter et al. | |
| 2013/0292539 A1* | 11/2013 | Speck | B60N 2/0722 248/429 |
| 2014/0091610 A1 | 4/2014 | Clark et al. | |
| 2016/0046208 A1 | 2/2016 | Anticuar et al. | |
| 2018/0126875 A1* | 5/2018 | Kume | B60N 2/0715 |
| 2018/0222352 A1* | 8/2018 | Flick | B60N 2/0727 |
| 2019/0135140 A1 | 5/2019 | Flick et al. | |
| 2020/0009995 A1 | 1/2020 | Sonar | |
| 2020/0238859 A1 | 7/2020 | Taniguchi | |
| 2020/0247279 A1 | 8/2020 | Hattori et al. | |
| 2021/0061137 A1 | 3/2021 | Flick et al. | |
| 2021/0078454 A1 | 3/2021 | Speck | |
| 2022/0212571 A1 | 7/2022 | Plancon et al. | |

FOREIGN PATENT DOCUMENTS

| | | |
|---|---|---|
| EP | 2 322 377 A1 | 5/2011 |
| JP | H06-191328 A | 7/1994 |
| JP | 2004-210258 A | 7/2004 |
| WO | WO-2014/073660 A1 | 5/2014 |

OTHER PUBLICATIONS

Extended European Search Report issued in connection with EP Appl. No. 22764129.7 dated Jan. 14, 2025.

* cited by examiner

REINFORCED TRACK ASSEMBLY FOR VEHICLE SEAT

CROSS-REFERENCE TO RELATED PATENT APPLICATIONS

This application is a continuation of U.S. patent application Ser. No. 17/686,889, filed Mar. 4, 2022, which claims the benefit of and priority to U.S. Provisional Patent Application No. 63/157,331, filed Mar. 5, 2021, both of which are incorporated herein by reference in their entireties.

BACKGROUND

A typical vehicle includes a cabin that has a seat assembly that accommodates and supports an occupant. The seat assembly includes a seat and a track assembly that secures the seat to a floor of the cabin. The track assembly may facilitate repositioning the seat between a plurality of positions (i.e., translate the seat forward or backward).

SUMMARY

One embodiment relates to a track assembly for mounting a seat within a vehicle. The track assembly includes a first track having a first inner surface, a first support coupled to the first inner surface, a second track having a second inner surface, and a second support coupled to the second inner surface. The second track is slidably coupled to the first track. The first support has a first free end that extends from the first inner surface at a downward sloping angle. The second support has a second free end that extends from the second inner surface at an upward sloping angle. The first support and the second support are positioned such that the second free end is disposed above the first free end.

Another embodiment relates to a vehicle seat. The vehicle seat includes a seat and a track assembly for mounting the seat within a vehicle. The track assembly includes a first track having a first inner surface, a first support coupled to the first inner surface, a second track having a second inner surface, and a second support coupled to the second inner surface. The second track is slidably coupled to the first track. The first support has a first free end that extends from the first inner surface at a downward sloping angle. The second support has a second free end that extends from the second inner surface at an upward sloping angle. The first support and the second support are positioned such that the second free end is disposed above the first free end.

Still another embodiment relates to a track assembly for mounting a seat within a vehicle. The track assembly includes an upper rail, a lower rail, and a latch assembly. The upper rail includes a top wall, a first upper sidewall, a second upper sidewall, a support bracket, and a first support. The first upper sidewall extends downward from a first side of the top wall and terminates with a first lip. The first upper sidewall defines (i) a latch slot and (ii) a plurality of first apertures positioned beneath the latch slot. The second upper sidewall extends downward from an opposing second side of the top wall and terminates with a second lip. The support bracket is coupled to the first upper sidewall. The support bracket includes a flange extending through the latch slot, an arm extending from the flange, and a support plate extending from the arm and having a plurality of support teeth. The arm is positioned along a first inner surface of the first upper sidewall and proximate the latch slot. The first support is coupled to the first inner surface. The first support has a first free end that extends from the first inner surface at a downward sloping angle. The lower rail includes a bottom wall, a first lower sidewall, a second lower sidewall, and a second support. The first lower sidewall extends upward from a first side of the bottom wall and terminates with a third lip. The third lip defines a plurality of second apertures. The second lower sidewall extends upward from an opposing second side of the bottom wall and terminates with a fourth lip. The third lip and the fourth lip engage with the first lip and the second lip to slidably couple the lower rail and the upper rail together. The second support is coupled to a second inner surface of the second lower sidewall. The second support has a second free end that extends from the second inner surface at an upward sloping angle. The second free end of the second support defines a plurality of third apertures positioned therealong. The first support and the second support are positioned such that the second free end is positioned above the first free end. The latch assembly is coupled to the flange and extends through the latch slot. The latch assembly includes latch plate and a reinforcing plate. The latch plate has a plurality of latch teeth that selectively extend through the plurality of first apertures of the first upper sidewall and through a subset of the plurality of second apertures of the third lip. The reinforcing plate has a plurality of reinforcing teeth that (i) selectively extend through a subset of the plurality of third apertures of the second support and (ii) selectively engage with the plurality of support teeth of the support bracket.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a seat track assembly of the present disclosure includes a latch assembly that facilitates locking a seat in a desired position. Specifically, the track assembly and the latch assembly are designed such that the track assembly can be used with both front row seats and rear row seats. To accommodate differing industry strength requirements between the front row seats and the rear row seats, additional support and retention components can be added to meet increased requirements.

Traditionally, seat manufacturers have designed front row track assemblies and rear row track assemblies independent of each other, which leads to inefficiencies and increased material/production costs. Advantageously, the track assembly of the present disclosure mitigates these issues by permitting use with both front and rear row seats by utilizing the same base components and only requiring the addition of a few support/reinforcing components, which provides production scaling advantages that reduce production costs while still meeting or exceeding industry strength requirements.

Figure 1:
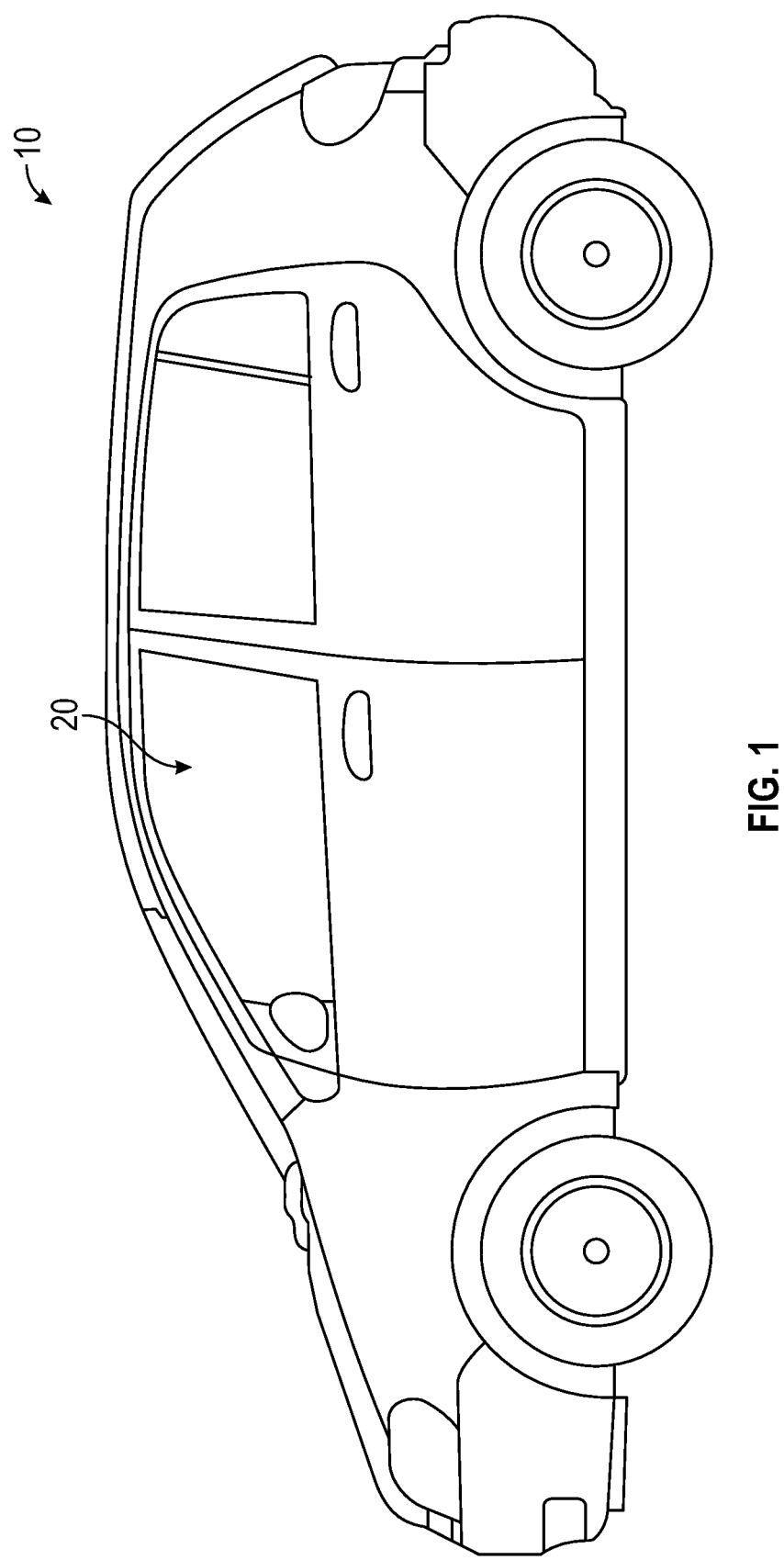
FIG. 1 is a side view of a vehicle, according to an exemplary embodiment.
Figure 2:
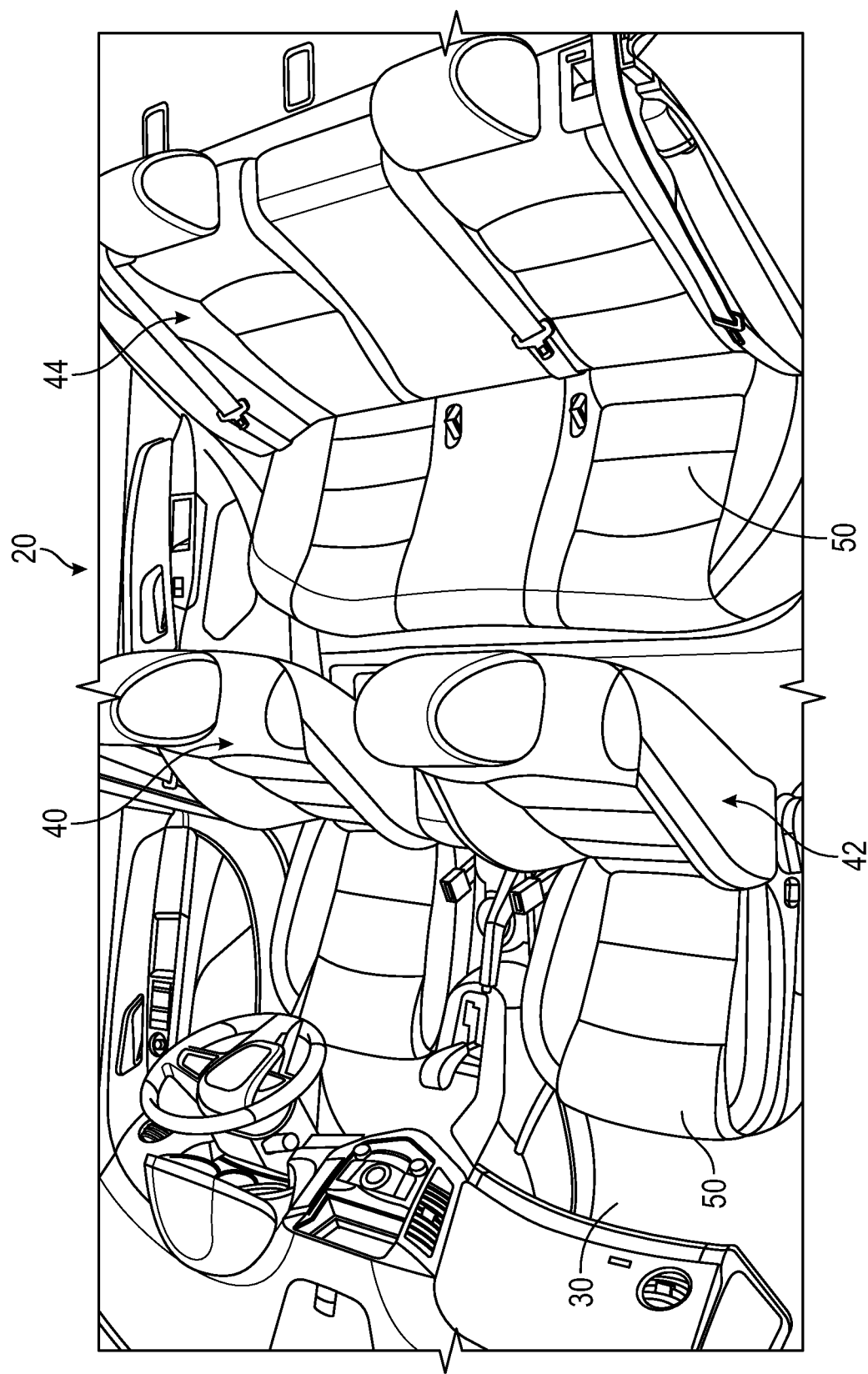
FIG. 2 is a perspective view of a cabin of the vehicle of FIG. 1 including a seat, according to another exemplary embodiment.

As shown in FIGS. 1 and 2, a vehicle 10 includes an interior cabin, shown as passenger cabin 20. In one embodiment, the vehicle 10 is configured as an on-road vehicle such as a sedan, a sport utility vehicle ("SUV"), a pickup truck, a van, and/or still another type of passenger vehicle. In other embodiments, the vehicle 10 is configured as another type of on-road vehicle such as a semi-truck, a bus, or the like. In still other embodiments, the vehicle 10 is configured as an off-road vehicle such as construction machinery, farming machinery, or the like.

As shown in FIG. 2, the passenger cabin 20 includes a support surface, shown as cabin floor 30, that supports one or more seating assemblies, shown as seats 40, including one or more first seating assemblies, shown as front seats 42, and one or more second seating assemblies, shown as rear seats 44. In some embodiments, the front seats 42 are different than the rear seats 44. In other embodiments, the front seats 42 and the rear seats 44 are the same or utilize similar components (e.g., to facilitate increased scaling for manufacturing and, therefore, a reduction in production costs). By way of example, the front seats 42 and the rear seats 44 may utilize a similar track assembly, however, the track assembly for one of the front seats 42 or the rear seats 44 may include one or more additional components (e.g., for added strength, to meet or exceed industry standards, etc.). In some embodiments, the passenger cabin 20 does not include the rear seats 44. In some embodiments, the passenger cabin 20 only includes a single front seat 42.

Figure 3:
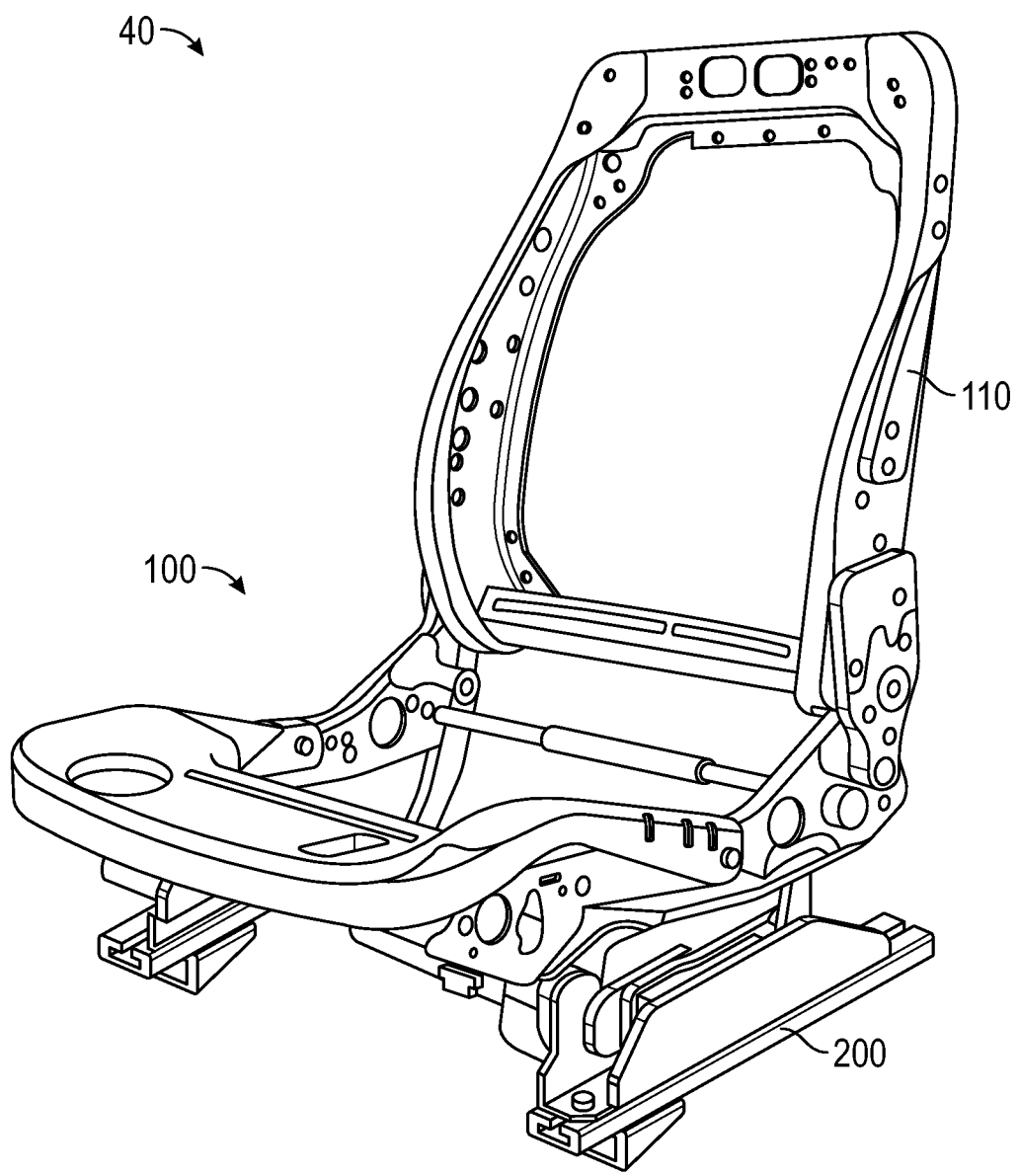
FIG. 3 is a perspective view of a frame assembly of the seat of FIG. 2 including a seat frame assembly and a track assembly, according to an exemplary embodiment.

As shown in FIGS. 2 and 3, each of the seats 40 includes a plurality of padded components (e.g., a seat back pad or cushion, a seat bottom pad or cushion, etc.), shown as seat cushions 50, and a framing assembly, shown as frame assembly 100. As shown in FIG. 3, the frame assembly 100 includes (i) a first frame portion, shown as seat frame assembly 110, configured to support the seat cushions 50 and (ii) a second frame portion, shown as track assembly 200, configured to support and couple to the seat frame assembly 110 and, thereby, couple the seat 40 to the cabin floor 30. According to an exemplary embodiment, the track assembly 200 is adjustable (e.g., manually adjustable, electronically adjustable, etc.) such that the position of the seat 40 can be selectively adjusted (e.g., the seat 40 can be slid forward, rearward, etc.).

Figure 4:
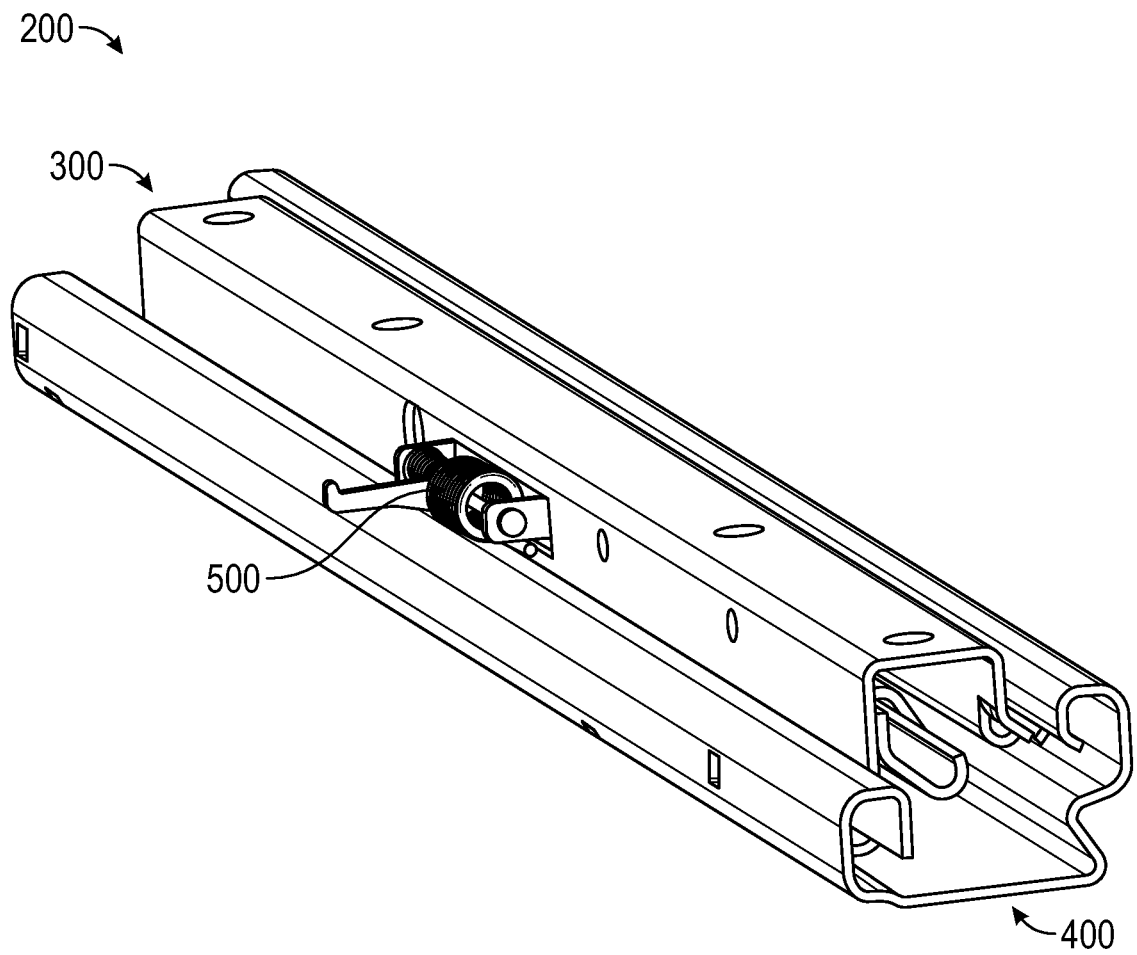
FIGS. 4 and 5 are various detailed perspective views of the track assembly of FIG. 3 including an upper rail, a lower rail, and a latch assembly, according to an exemplary embodiment.
Figure 5:
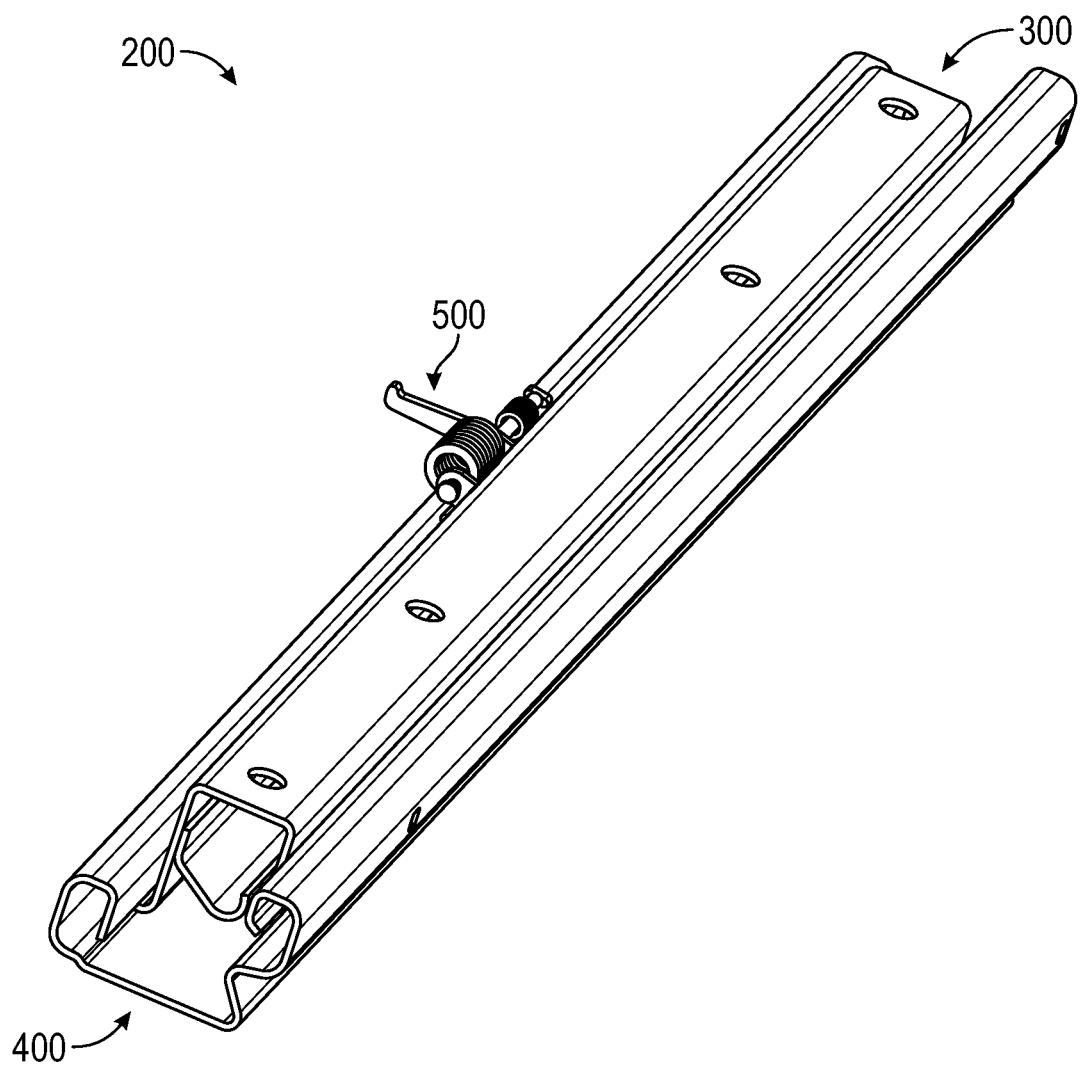

As shown in FIGS. 4 and 5, the track assembly 200 includes a first track, shown as upper rail 300, a second track, shown as lower rail 400, and a securing mechanism, shown as latch assembly 500. According to an exemplary embodiment, the latch assembly 500 is configured to selectively secure or lock the upper rail 300 in a desired position along the lower rail 400 and prevent relative movement therebetween.

Figure 6:
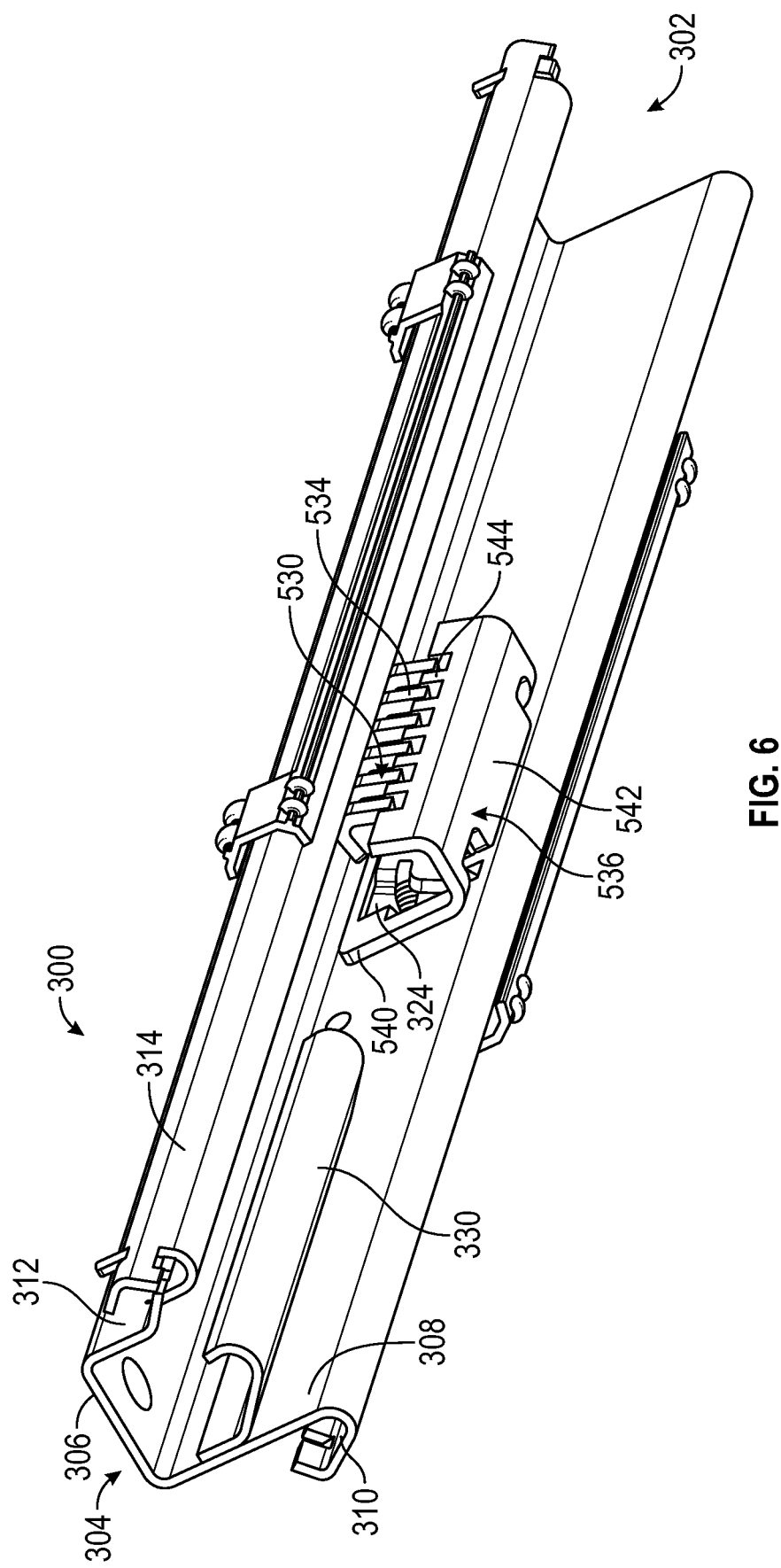
FIGS. 6-8 are various views of the upper rail and the latch assembly of FIGS. 4 and 5, according to an exemplary embodiment.
Figure 7:
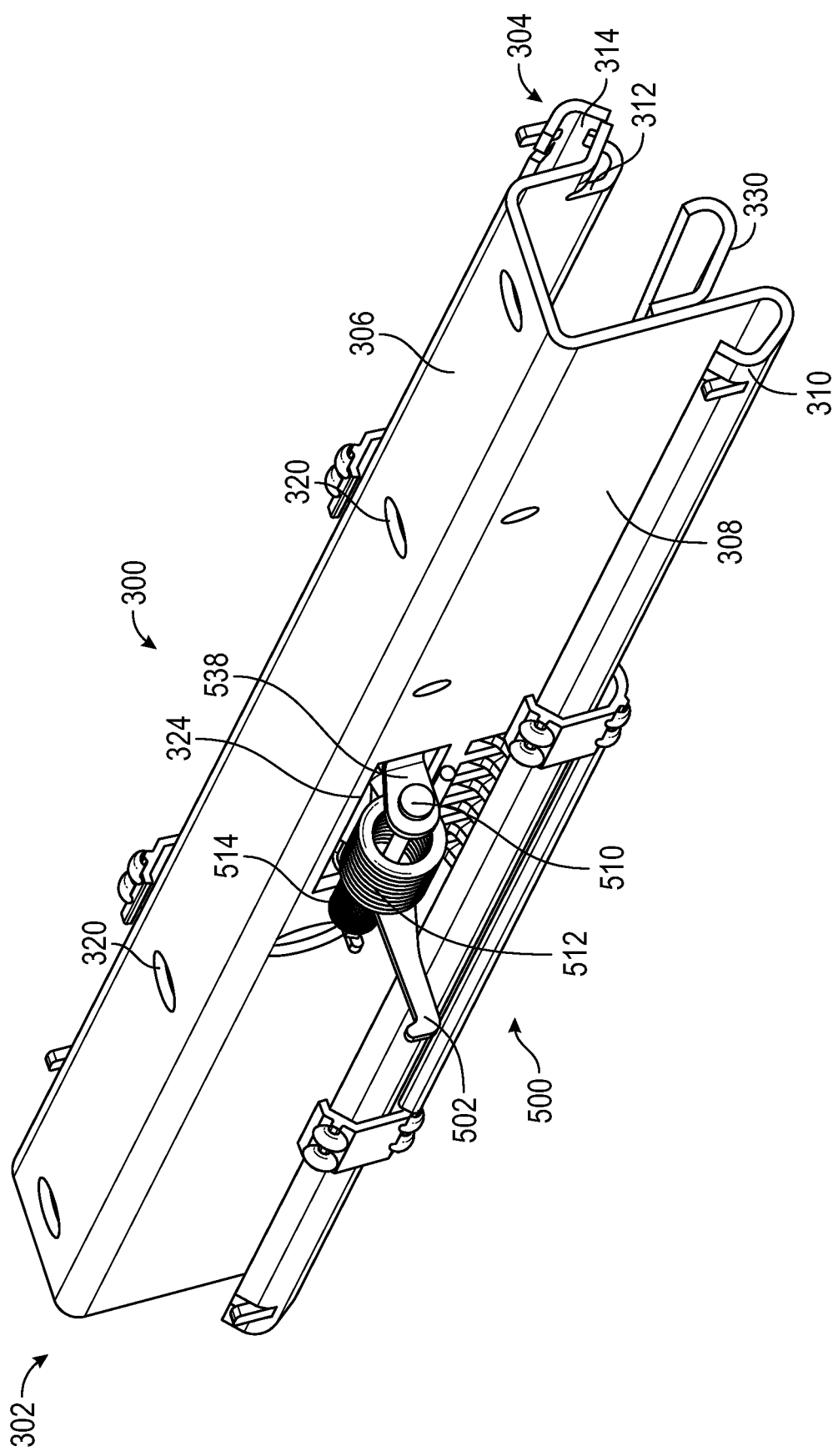
Figure 8:
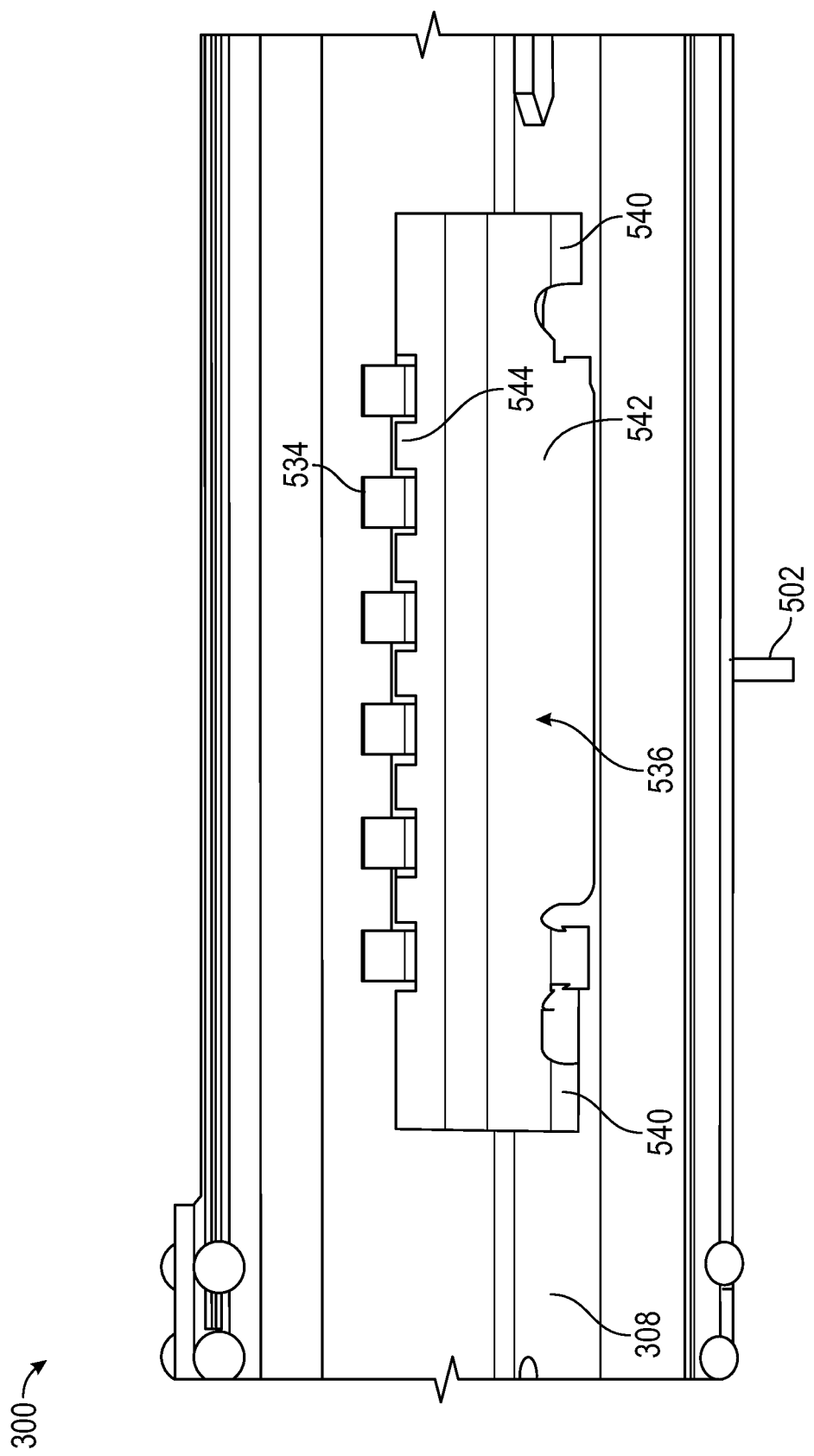

As shown in FIGS. 6-8, the upper rail 300 has (i) a first end, shown as end 302, and an opposing second end, shown as end 304, that are spaced longitudinally apart and (ii) a cross-sectional profile defined by (a) a first wall, shown as top wall 306, (b) a second wall, shown as first sidewall 308, extending downward from a first side of the top wall 306 and terminating with a first lip, shown as first flange 310, and (c) a third wall, shown as second sidewall 312, extending downward from an opposing second side of the top wall 306 and terminating with a second lip, shown as second flange 314. According to the exemplary embodiment shown in FIGS. 6 and 7, the first sidewall 308 is longer or taller than the second sidewall 312 such that the cross-sectional profile is non-uniform or non-symmetrical (e.g., an "r" shaped profile, etc.). In other embodiments, the cross-sectional profile is uniform or symmetrical.

Figure 9:
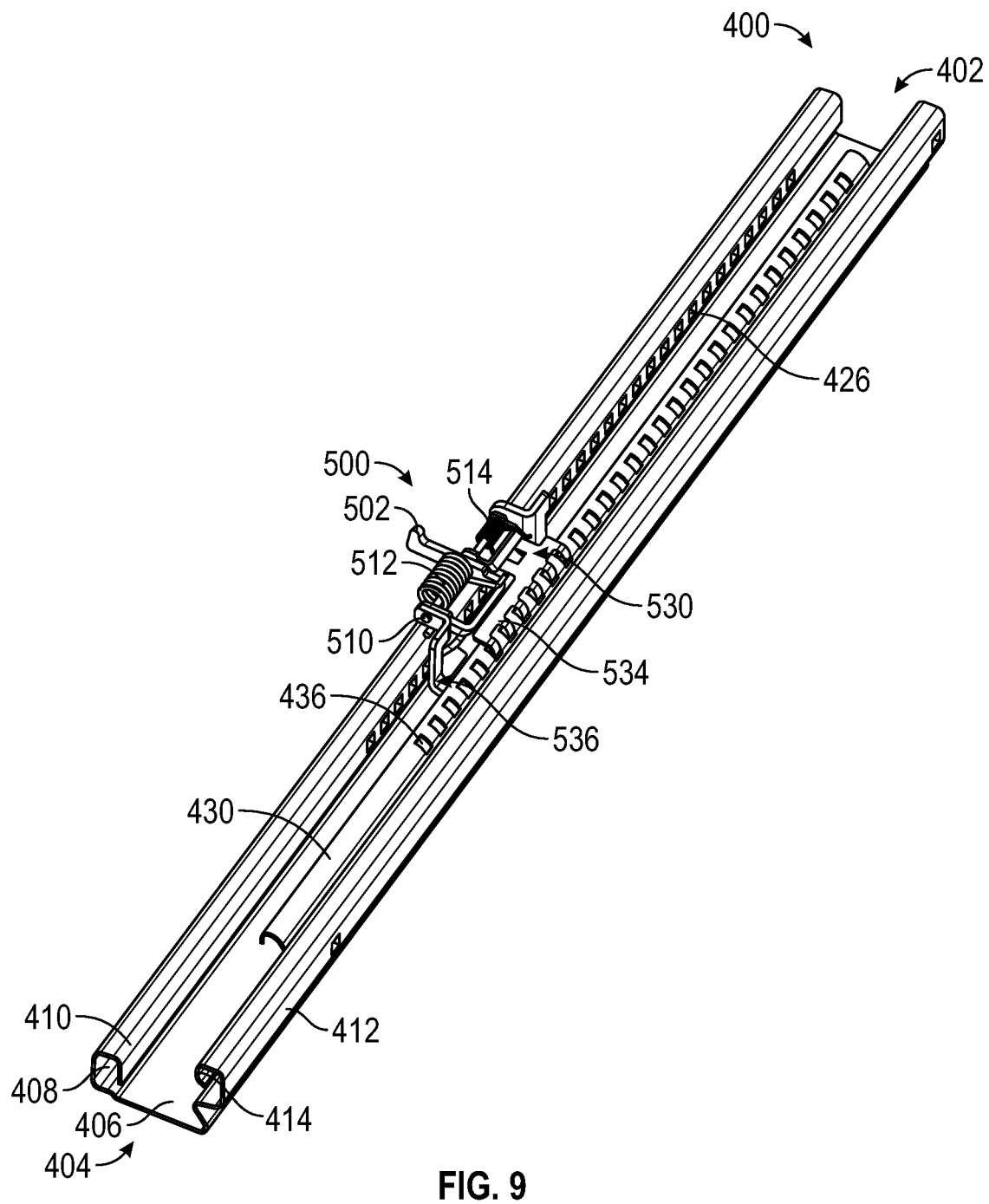
FIGS. 9-12 are various views of the lower rail and the latch assembly of FIGS. 4 and 5, according to an exemplary embodiment.
Figure 10:
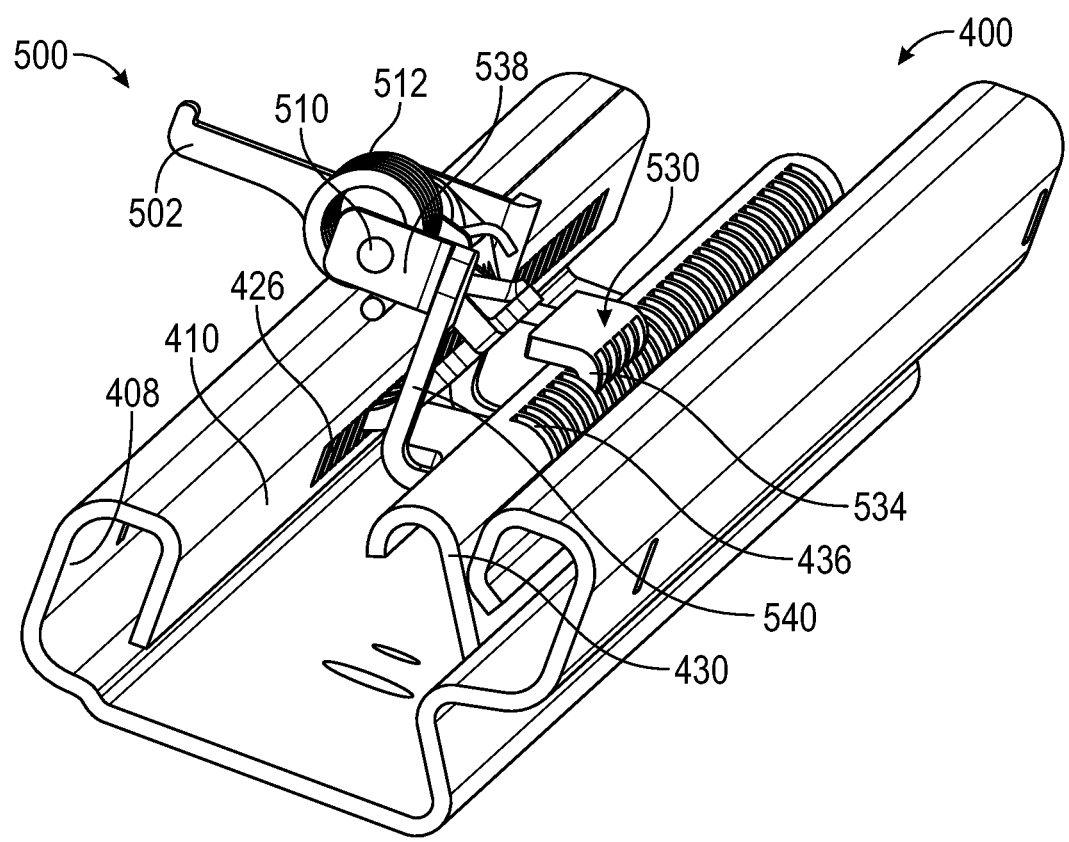
Figure 11:
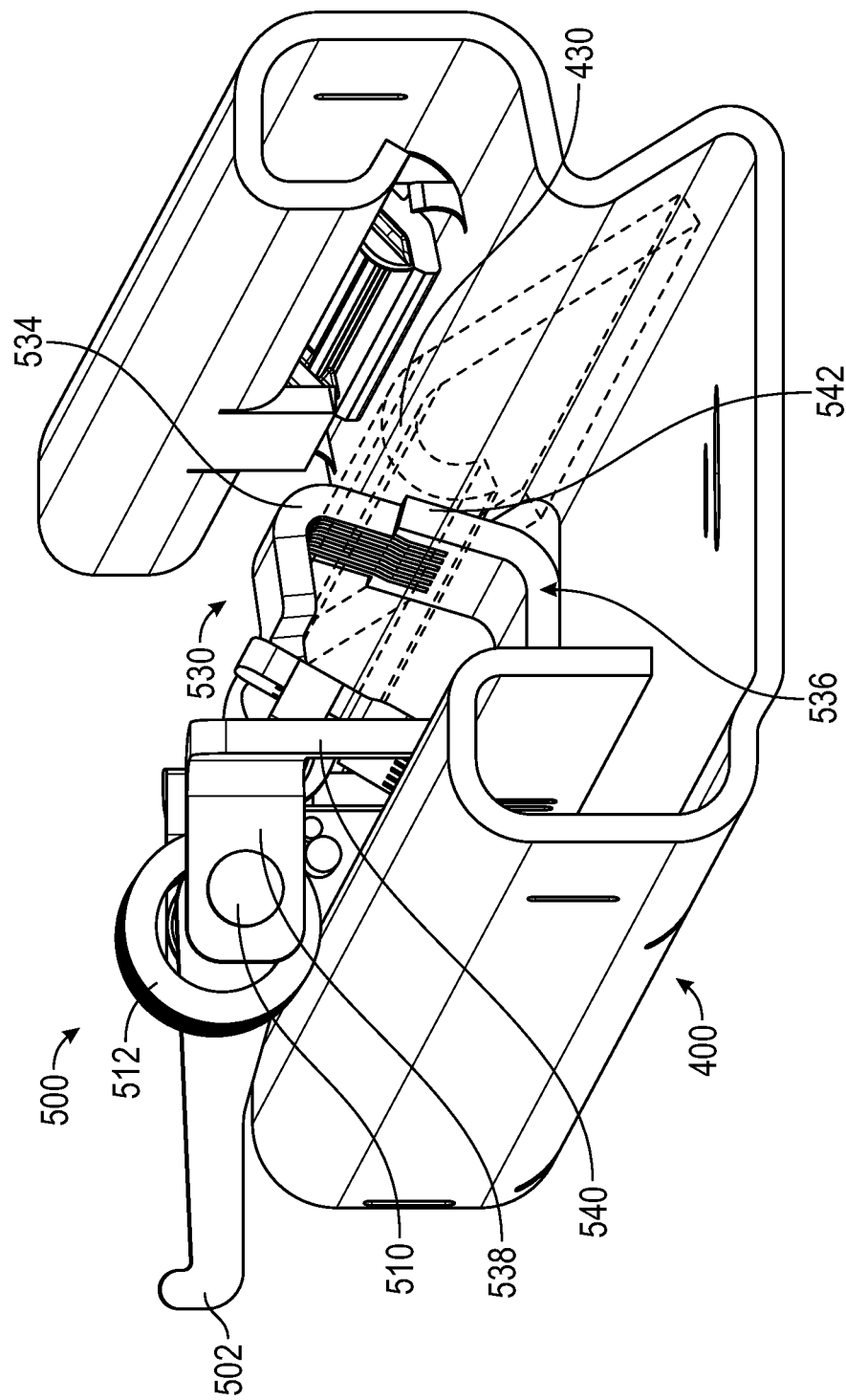

As shown in FIGS. 9 and 10, the lower rail 400 has (i) a first end, shown as end 402, and an opposing second end, shown as end 404, that are spaced longitudinally apart and (ii) a cross-sectional profile defined by (a) a first wall, shown as bottom wall 406, (b) a second wall, shown as first sidewall 408, extending upward from a first side of the bottom wall 406 and terminating with a first lip, shown as first flange 410, and (c) a third wall, shown as second sidewall 412, extending upward from an opposing second side of the bottom wall 406 and terminating with a second lip, shown as second flange 414. According to the exemplary embodiment shown in FIGS. 9 and 10, the second sidewall 412 is longer or taller than the first sidewall 408 such that the cross-sectional profile is non-uniform or non-symmetrical. In other embodiments, the cross-sectional profile is uniform or symmetrical.

As shown in FIGS. 13-17, (i) the first flange 410 of the lower rail 400 slidably receives the first flange 310 of the upper rail 300 and (ii) the second flange 414 of the lower rail 400 slidably receives the second flange 314 of the upper rail 300 to slidably couple the upper rail 300 to the lower rail 400. As shown in FIG. 7, the top wall 306 of the upper rail 300 defines a plurality of apertures, shown as attachment apertures 320. According to an exemplary embodiment, the attachment apertures 320 are configured to facilitate coupling the upper rail 300, and thereby the track assembly 200, to the seat frame assembly 110 of the frame assembly 100 of the seat 40 using fasteners (e.g., bolts, screws, rivets, etc.). In other embodiments, the upper rail 300 is welded or otherwise coupled to the seat frame assembly 110. According to an exemplary embodiment, the bottom wall 406 of the lower rail 400 defines a plurality of apertures (e.g., similar to the attachment apertures 320). The plurality of apertures of the bottom wall 406 are configured to facilitate coupling the lower rail 400, and thereby the seat 40, to the cabin floor 30 of the vehicle 10.

Figure 14:
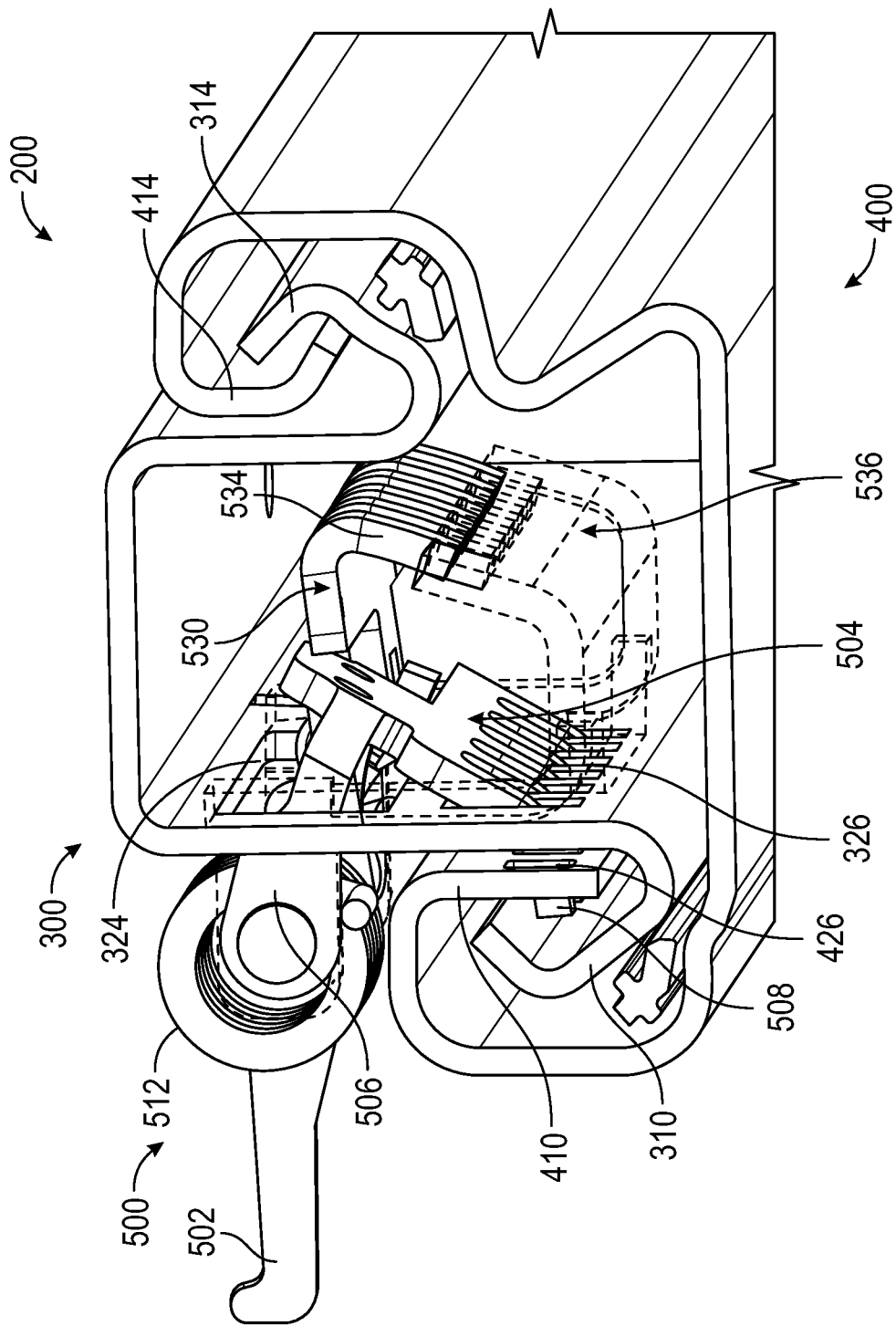

As shown in FIGS. 6-8 and 14, the first sidewall 308 of the upper rail defines a cutout, shown as latch assembly slot 324, positioned between the end 302 and the end 304 thereof (e.g., proximate a midpoint therebetween, etc.). As shown in FIGS. 9, 10, and 14, (i) the first sidewall 308 of the upper rail 300 defines a first plurality of apertures or slots, shown as retention slots 326, positioned beneath the latch assembly slot 324 and (ii) the first flange 410 of the lower rail 400 defines a second plurality of apertures or slots, shown as retention slots 426. According to the exemplary embodiment shown in FIGS. 9, 10, and 14, the upper rail 300 defines a first quantity of the retention slots 326 (e.g., between one and ten slots, between two and eight slots, three slots, four slots, five slots, six slots, etc.) and the lower rail 400 defines a second quantity of the retention slots 426 (e.g., between two and forty slots, five slots, ten slots, fifteen slots, twenty slots, twenty-five slots, thirty slots, etc.) where the first quantity is less than the second quantity. According to an exemplary embodiment, the retention slots 326 of the upper rail 300 are configured to slidably align with the retention slots 426 of the lower rail 400. As described in greater detail herein, when the upper rail 300 is in a desired position along the lower rail 400 and when the retention slots 326 align with a subset of the retention slots 426, the latch assembly 500 is configured to engage with the retention slots 326 and the subset of the retention slots 426 to facilitate securing the upper rail 300 in the desired position and prevent relative movement between the upper rail 300 and the lower rail 400.

As shown in FIGS. 6, 7, and 15-17, the upper rail 300 includes a first reinforcing element (e.g., a bracket, an arm, a hook, a flange, etc.), shown as upper support 330, coupled (e.g., welded, with fasteners, etc.) to the inner surface of the first sidewall 308 at a position between the end 304 of the upper rail 300 and the latch assembly 500. While the upper support 330 is shown as being positioned proximate the end 304 of the upper rail 300, in other embodiments, the upper support 330 is otherwise positioned (e.g., proximate the end 302, closer to the latch assembly 500, etc.). According to the exemplary embodiment shown in FIGS. 6,7, and 15-17, the upper support 330 has a "J" shape. In other embodiments, the upper support 330 has another shape (e.g., a "U" shape, an "L" shape, a "V" shape, etc.).

As shown in FIGS. 9-13 and 15-17, the lower rail 400 includes a second reinforcing element (e.g., a bracket, an arm, a hook, a flange, etc.), shown as lower support 430, coupled (e.g., welded, with fasteners, etc.) to the inner surface of the second sidewall 412 at a position between the end 402 and the end 404 of the lower rail 400. According to an exemplary embodiment, the lower support 430 extends along a majority of the length of the lower rail 400. In some embodiments, the upper support 330 extends a first length along the upper rail 300 and the lower support 430 extends a second length along the lower rail 400. In some embodiments, the first length and the second length are the same. In some embodiments, the first length differs from the second length. For example, in one embodiment, the second length is greater than or equal to the first length (e.g., the lower support 430 is longer than the upper support 330 in a longitudinal direction). According to the exemplary embodiment shown in FIGS. 9-13 and 15-17, the lower support 430 has a "J" shape. In other embodiments, the lower support 430 has another shape (e.g., a "U" shape, an "L" shape, a "V" shape, etc.).

Figure 15:
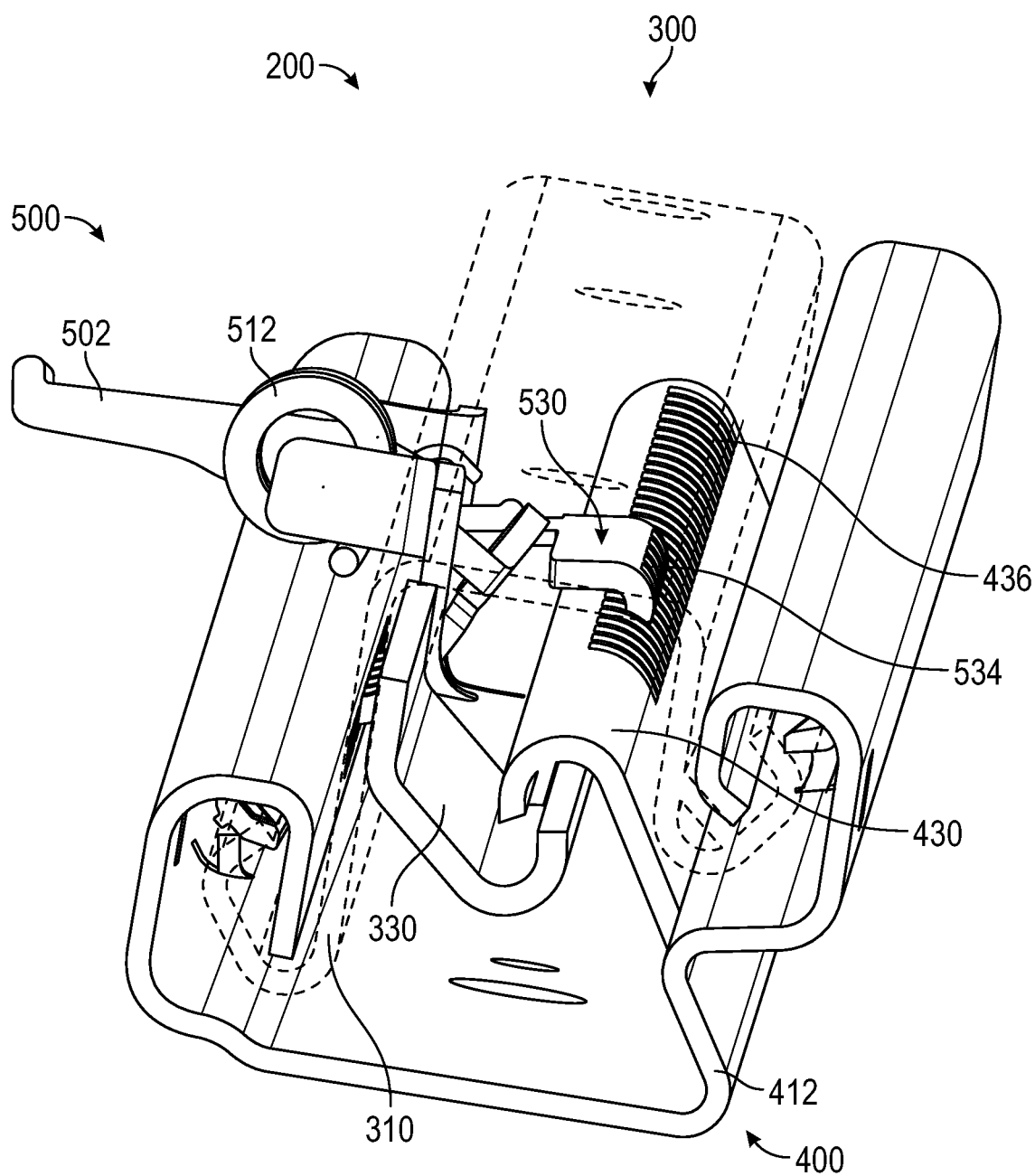
Figure 16:
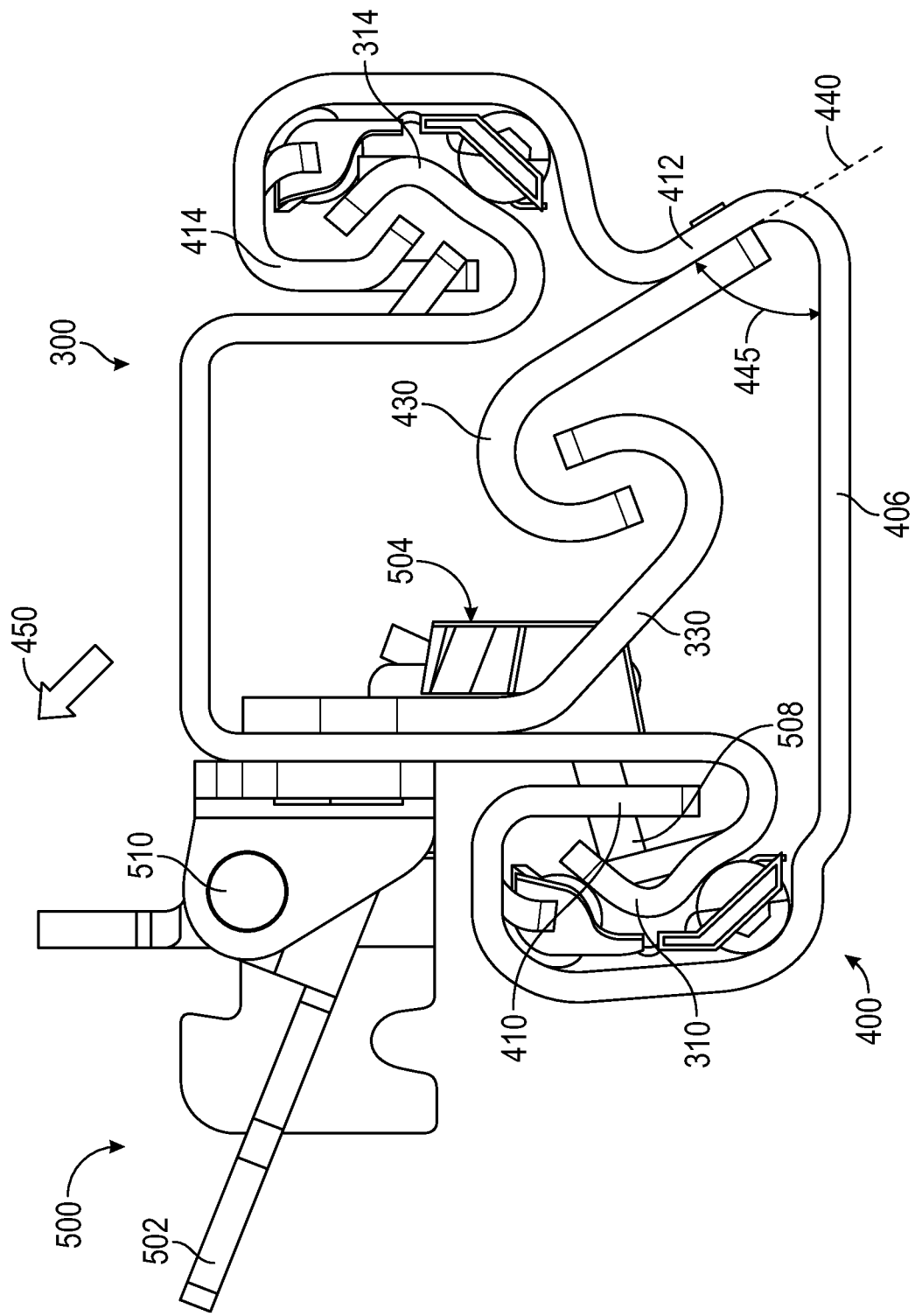
FIGS. 16 and 17 are various views of the track assembly of FIG. 3 including an upper rail, a lower rail, and a latch assembly, according to another exemplary embodiment.
Figure 17:
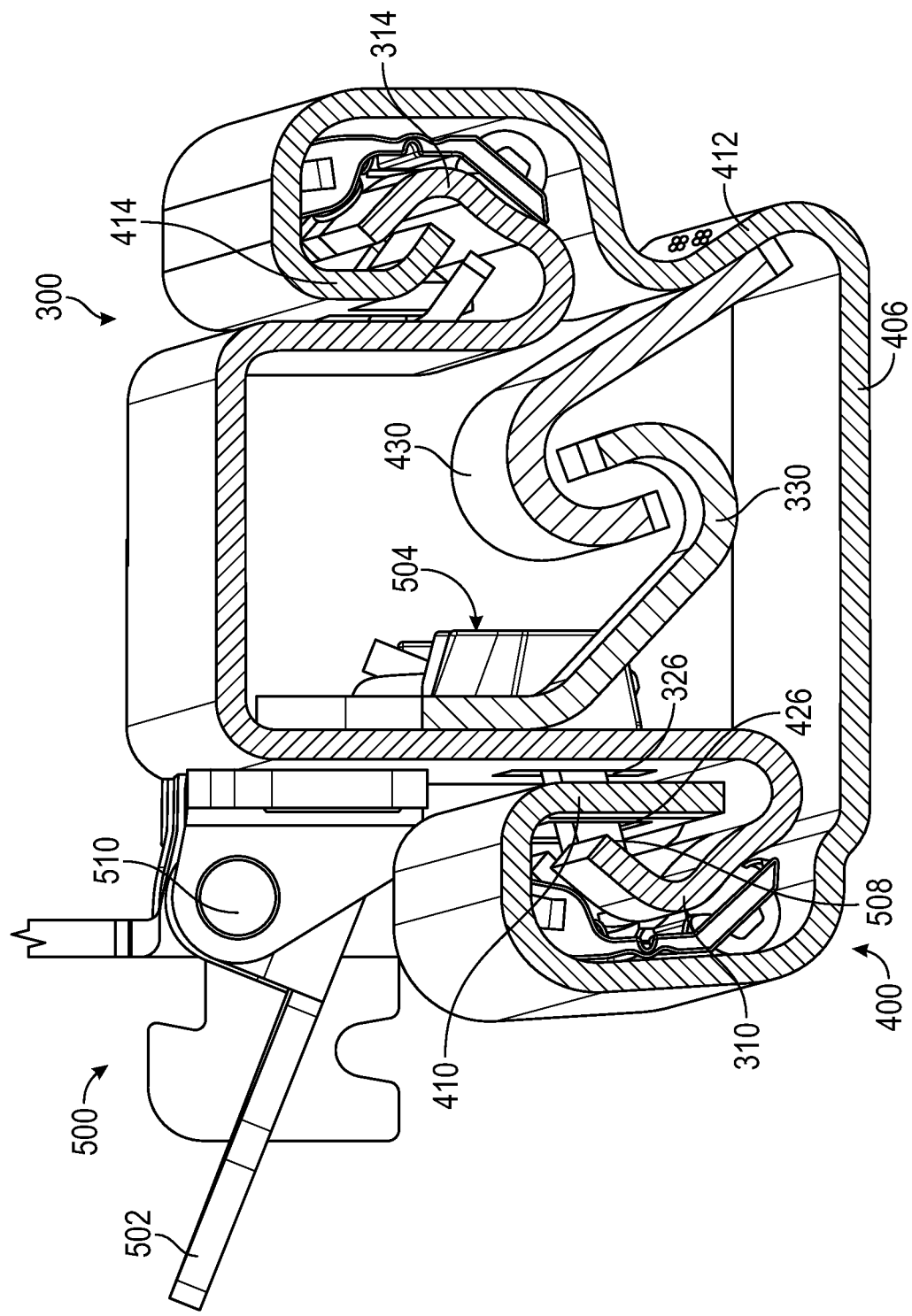

As shown in FIGS. 15-17, (i) the upper support 330 extends inward from the first sidewall 308 of the upper rail 300 at a downward sloping angle toward the center of the track assembly 200 and (ii) the lower support 430 extends inward from the second sidewall 412 of the lower rail 400 at an upward sloping angle toward the center of the track assembly 200 such that free ends (e.g., curved portions, etc.) of the upper support 330 and the lower support 430 interface or engage each other. According to the exemplary embodiment shown in FIGS. 15-17, the free end of the upper support 330 is positioned beneath the free end of the lower support 430. In other embodiments, the free end of the upper support 330 is positioned above the free end of the lower support 430 (i.e., the orientations thereof are flipped).

As shown in FIGS. 9, 10, 12, and 15, the free end (e.g., curved portion, etc.) of the lower support 430 defines a plurality of apertures or slots (e.g., between two and forty slots, five slots, ten slots, fifteen slots, twenty slots, twenty-five slots, thirty slots, etc.), shown as reinforcing slots 436. In some embodiments, the lower support 430 does not define the reinforcing slots 436 (see, e.g., FIGS. 16 and 17). According to the exemplary embodiment shown in FIGS. 9, 10, 12, and 15, the reinforcing slots 436 are defined and extend along a majority of a longitudinal length of the lower support 430 and are offset toward the end 402 of the lower rail 400. As described in greater detail herein, when the upper rail 300 is in a desired position along the lower rail 400, the latch assembly 500 is configured to engage with a subset of the reinforcing slots 436 to facilitate further securing the upper rail 300 in the desired position and prevent relative movement between the upper rail 300 and the lower rail 400.

Figure 12:
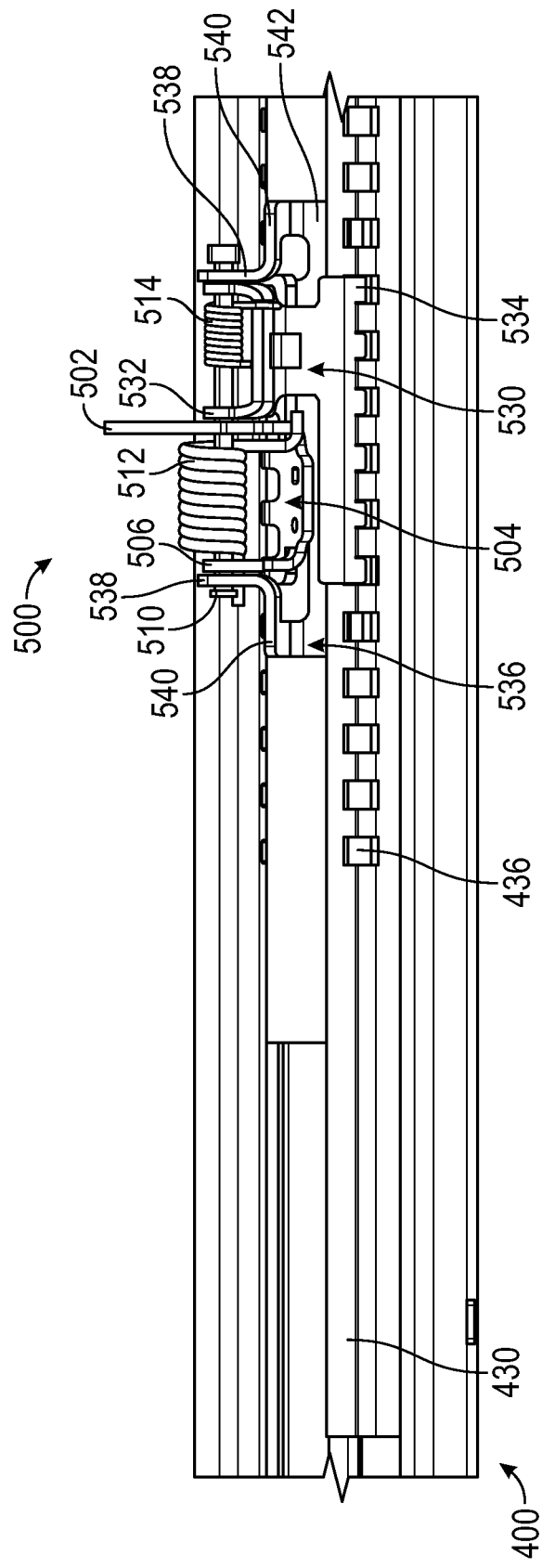
Figure 13:
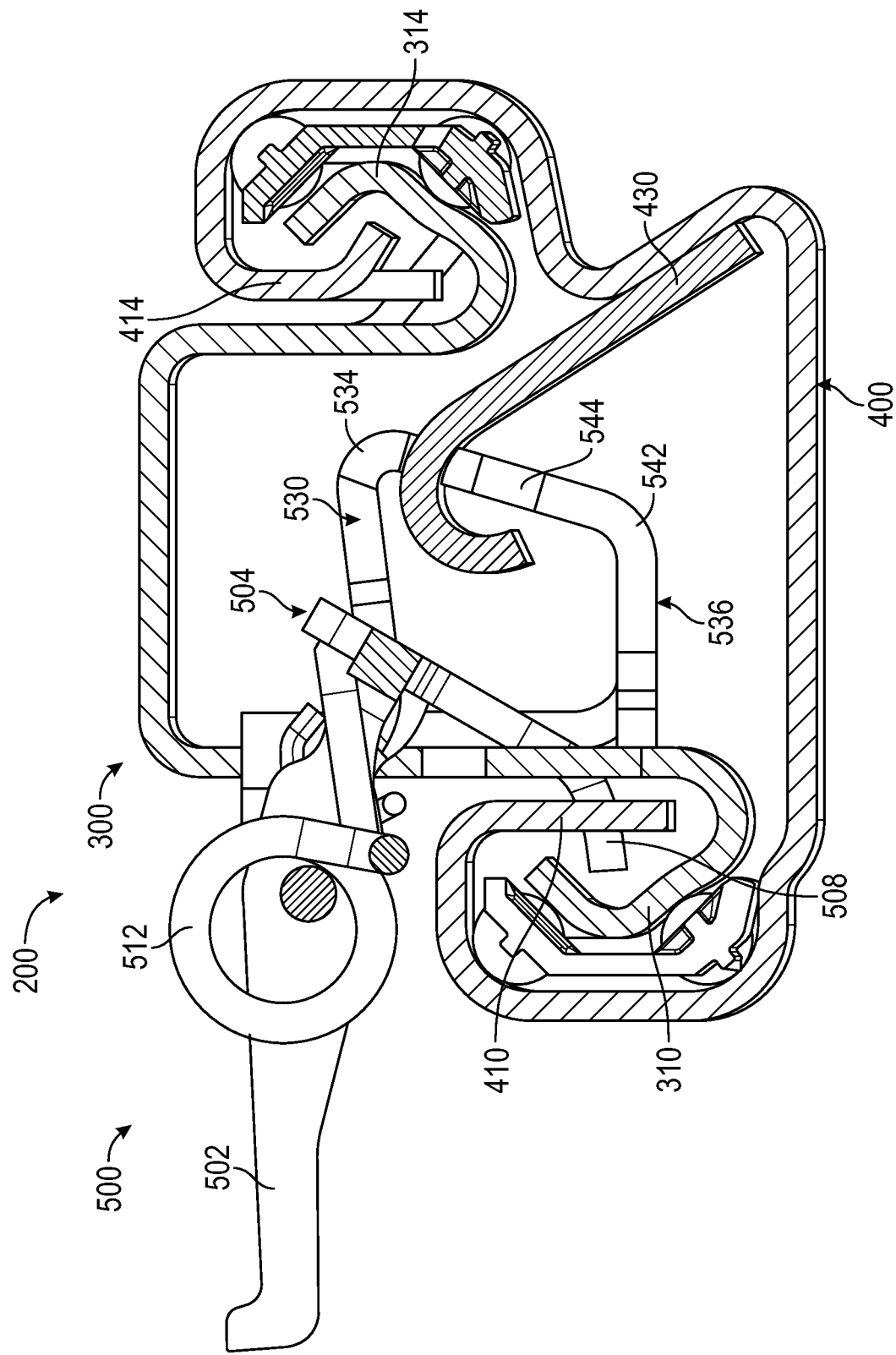
FIGS. 13-15 are various views of the latch assembly securing the upper rail and the lower rail relative to each other, according to an exemplary embodiment.

As shown in FIGS. 6-15, the latch assembly 500 includes (i) an actuator, shown as lever arm 502, (ii) a first or primary locking fixture, shown as latch plate 504, (iii) a second or secondary locking fixture, shown as reinforcing plate 530, (iv) a supporting fixture, shown as support bracket 536, and (v) a pin, shown as latch pivot pin 510. In some embodiments, the latch assembly 500 does not include the reinforcing plate 530 or the support bracket 536 (see, e.g., FIGS. 16 and 17). As shown in FIGS. 7 and 10-12, the support bracket 536 includes a pair of supports, shown as support flanges 538, spaced apart from one another defining a gap therebetween and with the latch pivot pin 510 extending therebetween; a pair of extensions, shown as support arms 540, extending downward from the support flanges 538; and a curved plate, shown as support plate 542, extending between lower ends of the support arms 540 and defining a plurality of projections along a free end thereof, shown as bracket teeth 544. As shown in FIG. 6, the support arms 540 extends along and are coupled (e.g., welded, using fasteners, etc.) to the inner surface of the upper rail 300 and positioned around the latch assembly slot 324, thereby coupling the support bracket 536 to the upper rail 300. As shown in FIG. 7, the support flanges 538 extend rearward or outward from upper ends of the support arms 540 through the latch assembly slot 324 to an exterior of the upper rail 300. As shown in FIGS. 8 and 13, the support plate 542 extends inward from the support arms 540 toward the center of the track assembly 200.

As shown in FIGS. 12 and 14, the latch plate 504 includes a pair of connectors, shown as latch plate arms 506, that extend from the latch plate 504, through the latch assembly slot 324, and engage with the latch pivot pin 510 to couple the latch plate 504 to the lever arm 502. In some embodiments, the lever arm 502 is an extension of one of the latch plate arms 506. As shown in FIGS. 13 and 14, the latch plate 504 defines a plurality of projections along a free end thereof, shown as latch teeth 508. As shown in FIG. 12, the reinforcing plate 530 includes a pair of connectors, shown as reinforcing plate arms 532, that extend from the reinforcing plate 530, through the latch assembly slot 324, and engage with the latch pivot pin 510 to couple the reinforcing plate 530 to the lever arm 502. As shown in FIGS. 6 and 8-15, the reinforcing plate 530 defines a plurality of projections along a free end thereof, shown as reinforcing plate teeth 534. As shown in FIG. 12, the latch plate arms 506 of the latch plate 504 and the reinforcing plate arms 532 of the reinforcing plate 530 are coupled along the latch pivot pin 510 between the support flanges 538 of the support bracket 536 with the lever arm 502 positioned therebetween. According to an exemplary embodiment, manipulation of the lever arm 502 causes the latch plate 504 and the reinforcing plate 530 to pivot about the latch pivot pin 510 and relative to the upper rail 300 and the lower support 430 of the lower rail 400.

As shown in FIGS. 7 and 9-15, the latch assembly 500 includes one or more biasing elements (e.g., a torsion springs, two biasing elements, etc.), shown as latch return spring 512 and latch return spring 514. According to an exemplary embodiment, actuating the lever arm 502 contracts the latch return spring 512 and the latch return spring 514, and pivots the latch plate 504 and the reinforcing plate 530 about the latch pivot pin 510 from (i) an engaged or locked position (as shown in FIGS. 6 and 8-15) where relative movement between the upper rail 300 and the lower rail 400 is limited or prevented to (ii) a disengaged or unlocked position where relative movement between the upper rail 300 and the lower rail 400 is permitted. When the lever arm 502 is released, the latch return spring 512 and the latch return spring 514 are configured to bias the latch plate 504 and the reinforcing plate 530, respectively, to pivot about the latch pivot pin 510 back to the engaged or locked position. While the latch assembly 500 is shown as including a manual actuator, in other embodiments, the latch assembly 500 additionally or alternatively includes an electronically-controllable actuator (e.g., a motor, a pneumatic actuator driven by an electronic pump, etc.) positioned to pivot the latch plate 504 and reinforcing plate 530 about the latch pivot pin 510.

As shown in FIGS. 13 and 14, the latch teeth 508 of the latch plate 504 extend through the retention slots 326 of the upper rail 300 and a subset of the retention slots 426 of the lower rail 400 when the latch plate 504 is in the engaged or locked position to substantially fix the positions of the upper rail 300 and the lower rail 400 relative to each other and prevent movement therebetween. In some applications, the holding force or longitudinal lock strength of the latch plate 504 when engaged with the retention slots 326 of the upper rail 300 and the subset of the retention slots 426 of the lower rail 400 is sufficient to meet industry strength requirements. However, in other applications, the holding force or longitudinal lock strength of the latch plate 504 when engaged with the retention slots 326 of the upper rail 300 and the subset of the retention slots 426 of the lower rail 400 may not be sufficient to meet industry strength requirements. By way of example, the track assembly 200 for the front seats 42 may have a different strength requirement than the track assembly 200 for the rear seats 44. Accordingly, the track assembly 200 of one of the front seats 42 or the rear seats 44 may not include the upper support 330, the lower support 430, the reinforcing plate 530, and/or the support bracket 536, while the track assembly 200 of the other of the front seats 42 or the rear seats 44 may include the upper support 330, the lower support 430, the reinforcing plate 530, and/or the support bracket 536 to meet or exceed the higher industry strength requirements, as described in greater detail herein. Therefore, because the track assemblies 200 for the front seats 42 and the rear seats 44 utilize similar base components (one just including additional strengthening components), significant cost savings can be realized through increased scaling for manufacturing that otherwise could not be achieved with different front and rear track assembly designs.

As shown in FIGS. 9-15, the reinforcing plate teeth 534 of the reinforcing plate 530 (i) extend through a subset of the reinforcing slots 436 of the lower support 430 and (ii) engage (e.g., interlock, mesh, interface, etc.) with the bracket teeth 544 of the support bracket 536 when the reinforcing plate 530 is in the engaged or locked position to increase the holding force or longitudinal lock strength of the latch assembly 500 and assist the latch plate 504 with locking the upper rail 300 and the lower rail 400 relative to each other and preventing translational movement therebetween. The engagement of the reinforcing plate teeth 534 of the reinforcing plate 530 with the reinforcing slots 436 of the lower support 430 as well as with the bracket teeth 544 of the support bracket 536 facilitates providing increased support and strength for fixing the upper rail 300 and the lower rail 400 relative to each other under loading conditions (e.g., hard acceleration, hard deceleration, collisions, etc.), according to an exemplary embodiment.

As shown in FIGS. 15-17, when the upper rail 300 is slidably coupled to and received by the lower rail 400, the free end of the upper support 330 of the upper rail 300 is positioned beneath the free end of the lower support 430 of the lower rail 400. Such arrangement of the upper support 330 and the lower support 430 provides increased separation or peel strength to prevent separation (e.g., lifting, lateral movement, etc.) of the upper rail 300 from the lower rail 400 under severe loading conditions (e.g., vehicle roll, collisions, hard accelerations/decelerations, etc.).

According to the exemplary embodiment shown in FIGS. 16 and 17, (i) the latch assembly 500 does not include the reinforcing plate 530 or the support bracket 536 and (ii) the lower support 430 of the lower rail 400 does not define the reinforcing slots 436 positioned therealong. Therefore, in such an embodiment, the latch plate 504 of the latch assembly 500 functions as the primary locking fixture that secures the upper rail 300 in position relative to the lower rail 400 and that provides the holding force or longitudinal lock strength for the track assembly 200.

In some embodiments, the lower support 430 is positioned at a predetermined angle with respect to the bottom wall 406 of the lower rail 400 to provide additional tensile support. For example, as shown in FIG. 16, the lower support 430 defines an axis 440 that extends substantially parallel to a portion of the lower support 430 that couples to the second sidewall 412 of the lower rail 400. The axis 440 is positioned at an angle between 40 and 80 degrees relative to the bottom wall 406 of the lower rail 400, shown as angle 445. According to one exemplary embodiment, the lower support 430 is positioned at an angle of about 58 degrees relative to the bottom wall 406 of the lower rail 400. In other embodiments, the lower support 430 is positioned at another angle relative to the bottom wall 406 of the lower rail 400 (e.g., between 30 and 70 degrees, between 40 and 65 degrees, between 45 and 60 degrees, 30 degrees, 35 degrees, 40 degrees, 45 degrees, 50 degrees, 55 degrees, 60 degrees, 65 degrees, 70 degrees, etc.). The lower support 430 can be configured to interface with, engage with, or otherwise contact the upper support 330 when a tensile load (e.g., a load applied in about a direction shown by arrow 450) is applied to a portion of the upper rail 300, or another portion of the track assembly 200. For example, the lower support 430 supports the upper support 330 when the upper rail 300 is pulled in a direction away from the lower rail 400 (e.g., in a direction that is about parallel to the direction shown by arrow 450, in an upward direction, in a direction that separates the upper rail 300 from the lower rail 400, etc.). The lower support 430 may support (e.g., interface with, engage with, contact, etc.) the upper support 330 when a force is applied to the upper rail 300, or to another component of the track assembly 200, in various other directions. For example, lower support 430 may support the upper support 330 when a force is applied in a direction substantially parallel to the first flange 410 (e.g., in a lateral or longitudinal direction) and/or in a direction substantially perpendicular to the first flange 410 (e.g., in an up or down direction).

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

The term "or," as used herein, is used in its inclusive sense (and not in its exclusive sense) so that when used to connect a list of elements, the term "or" means one, some, or all of the elements in the list. Language such as the phrases "at least one of X, Y, and Z" and "at least one of X, Y, or Z," unless specifically stated otherwise, are understood to convey that an element may be either X; Y; Z; X and Y; X and Z; Y and Z; or X, Y, and Z (i.e., any combination of X, Y, and Z). Thus, such language is not generally intended to imply that certain embodiments require at least one of X, at least one of Y, and at least one of Z to each be present, unless otherwise indicated.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the seat 40 and components thereof (e.g., the frame assembly 100, the track assembly 200, etc.) as shown in the various exemplary embodiments is illustrative only. Additionally, any element disclosed in one embodiment may be incorporated or utilized with any other embodiment disclosed herein.

The invention claimed is:

1. A track assembly for mounting a seat within a vehicle, the track assembly comprising:
a first track having a first support extending from a first surface, the first support having a first curved end; and
a second track slidably coupled to the first track, the second track having a second support extending from a second surface, the second support having a second curved end;
wherein the first support and the second support are positioned such that the second curved end interfaces with the first curved end;
wherein the first support extends a first longitudinal length along the first surface; and
wherein the second support extends a second longitudinal length along the second surface that is different than the first longitudinal length, and wherein the first support extends at a downward sloping angle; and the second support extends at an upward sloping angle.

2. The track assembly of claim 1, further comprising a latch assembly coupled to the first track, the latch assembly including a tooth, wherein the tooth is configured to extend through a portion of the second support to at least partially translationally fix movement of the second track relative to the first track.

3. The track assembly of claim 2, wherein the first surface of the first track defines a slot through which the latch assembly extends.

4. The track assembly of claim 1, wherein the first surface and the second surface are at opposing lateral sides of the track assembly.

5. The track assembly of claim 1, wherein the first support is configured to at least partially engage the second support in response to a load being applied to the track assembly in a direction that separates the first track from the second track.

6. A track assembly for mounting a seat within a vehicle, the track assembly comprising:
a first track having a first support extending from a first surface, the first support having a first free end;
a second track slidably coupled to the first track, the second track having a second support extending from a second surface, the second support having a second free end;
wherein the first surface and the second surface are at opposing lateral sides of the track assembly;
wherein the first support and the second support are positioned such that the second free end is disposed above the first free end;
wherein the first support extends at a downward sloping angle; and
wherein the second support extends at an upward sloping angle.

7. The track assembly of claim 6, further comprising a latch assembly coupled to the first track, wherein the latch assembly includes a tooth, wherein the tooth is configured to extend through a portion of the second support to at least partially translationally fix movement of the second track relative to the first track, and wherein the first surface of the first track defines a slot through which the latch assembly extends.

8. The track assembly of claim 6, wherein:
the first free end curves towards the second free end; and
the second free end curves towards the first free end.

9. The track assembly of claim 6, wherein the first support is configured to at least partially engage the second support in response to a load being applied to the track assembly in a direction that separates the first track from the second track.

10. The track assembly of claim 6, wherein:
the first support extends a first longitudinal length along the first surface; and
the second support extends a second longitudinal length along the second surface that is different than the first longitudinal length.

11. A track assembly for mounting a seat within a vehicle, the track assembly comprising:
a first track;
a latch assembly coupled to the first track, the latch assembly including a latch; and
a second track slidably coupled to the first track, the second track having a support coupled to an inner surface of the second track and extending at an upward sloping angle, the support defining an interface;
wherein the latch is configured to engage with the interface of the support to at least partially translationally fix the second track relative to the first track.

12. The track assembly of claim 11, wherein:
the interface includes one or more apertures; and
the latch includes one or more teeth.

13. The track assembly of claim 12, wherein:
the support is a second support;
the latch assembly further comprises a first support coupled to the first track; and
the one or more teeth are configured to extend through the one or more apertures of the second support and engage with the first support.

14. The track assembly of claim 11, wherein:
the interface is a first interface;
the latch is a first latch;
the latch assembly further comprises a second latch;
the second track defines a second interface;
the first track defines a third interface; and
the second latch is configured to engage with the second interface and the third interface to at least partially translationally fix the second track relative to the first track.

15. The track assembly of claim 11, wherein:
the support is a second support;
the first track includes a first support coupled to an inner surface of the first track and extending at a downward sloping angle; and
a portion of the first support is positioned to interface with a portion of the second support.

16. The track assembly of claim 15, wherein the first support is configured to at least partially engage the second support in response to a load being applied to the track assembly in a direction that separates the first track from the second track.

17. A track assembly for mounting a seat within a vehicle, the track assembly comprising:
a first track having a first support extending from a first surface, the first support having a first free end;
a second track slidably coupled to the first track, the second track having a second support extending from a second surface, the second support having a second free end;
wherein the first surface and the second surface are at opposing lateral sides of the track assembly;
wherein the first support and the second support are positioned such that the second free end is disposed above the first free end;
wherein the first free end curves towards the second free end; and
wherein the second free end curves towards the first free end.

18. A track assembly for mounting a seat within a vehicle, the track assembly comprising:
a first track having a first support extending from a first surface, the first support having a first free end;
a second track slidably coupled to the first track, the second track having a second support extending from a second surface, the second support having a second free end;
wherein the first surface and the second surface are at opposing lateral sides of the track assembly;
wherein the first support and the second support are positioned such that the second free end is disposed above the first free end; and
wherein the first support is configured to at least partially engage the second support in response to a load being applied to the track assembly in a direction that separates the first track from the second track.

19. A track assembly for mounting a seat within a vehicle, the track assembly comprising:
a first track having a first support extending from a first surface, the first support having a first free end;
a second track slidably coupled to the first track, the second track having a second support extending from a second surface, the second support having a second free end;
wherein the first surface and the second surface are at opposing lateral sides of the track assembly;
wherein the first support and the second support are positioned such that the second free end is disposed above the first free end;
wherein the first support extends a first longitudinal length along the first surface; and
wherein the second support extends a second longitudinal length along the second surface that is different than the first longitudinal length.

* * * * *